Oct. 4, 1966 P. W. TRUMAN ETAL 3,276,246
STUFFING BOX WITH LEAKAGE DETECTOR
Filed March 11, 1964

INVENTORS
PAUL W. TRUMAN
BY BILL R. BURRUSS
McLean and Boustead
ATTORNEYS

3,276,246
STUFFING BOX WITH LEAKAGE DETECTOR
Paul W. Truman and Bill R. Burruss, Tulsa, Okla., assignors, by mesne assignments, to Sinclair Research, Inc., New York, N.Y., a corporation of Delaware
Filed Mar. 11, 1964, Ser. No. 351,171
3 Claims. (Cl. 73—40.5)

Our invention pertains to oil wells and in particular to an improved wellhead construction whereby oil leakage is detected and prevented.

In the normal operation of an oil well a wellhead is provided through which a reciprocating rod, often called a polished rod, extends into the well where it operates a reciprocating pump causing oil to flow up to the wellhead from which it is piped to storage. Since these wells are normally unattended for extended periods, automatic protection against loss of oil or damage to equipment is most desirable.

The oil is normally pumped under pressure to the wellhead from which it flows to storage through a horizontal pipe. It is prevented from escaping along the polished rod by packing rings incorporated in the wellhead in sliding sealing contact with a brass sleeve affixed over the rod. Oil leakage may, however, result upon the occurrence of either of two events; namely, packing ring failure or splitting of the brass sleeve and in each case considerable oil is often lost before the leak is detected. It is, therefore, an object of this invention to provide a means for detecting such leakage along the polished rod without undue loss of oil.

Various wellhead constructions have been suggested to prevent loss of oil due to leakage along the polished rod. Usually, the oil is trapped between two sets of packings and directed back into the well without giving any indication that leakage is present. With this construction, however, pumping efficiency is greatly reduced in cases of severe failure and oil can still be lost if both packings fail simultaneously.

In the practice of our invention we provide an auxiliary stuffing box which surrounds the rod above the main wellhead packing at the point where the rod leaves the wellhead. This stuffing box contains two packing glands; the lower packing gland loosely surrounds the rod permitting oil to flow upwardly into the stuffing box while its underside contacts the upper portion of the wellhead thereby preventing oil leakage between the wellhead and the auxiliary stuffing box. The upper gland fits snugly around the rod and prevents oil leakage out of the stuffing box along the rod.

In direct communication with the auxiliary stuffing box we provide a vessel disposed to collect any liquid which enters the auxiliary stuffing box, and in this vessel we provide a signal initiating device which is responsive to liquid level. In operation, leakage out of the wellhead along the sucker rod enters the auxiliary stuffing box where it accumulates in the collection vessel and initiates a signal which can be used to shut down a motor or gas engine or to trigger and alarm.

In a preferred variation of this invention, we combine the above described leakage detection with an auxiliary lubricator which prevents damage to the rod and packing in the event that oil stops flowing from the well. In this case we provide a weep hole in the collection chamber so that a normal amount of oil introduced by the auxiliary lubricator is drained from the auxiliary stuffing box without accumulating in the collection vessel. Thus leakage detection is dependent upon the presence of an abnormal amount of oil instead of merely upon an accumulation of oil.

A most favorable aspect of our invention is the ease with which existing wellheads can be modified to our improved construction. To this end we provide a two piece stuffing box which can be directly applied to the rod without having to be slipped over one end. Thus we are able to modify existing wellheads in a few minutes using simple hand tools.

The type of signal device used and the form of the signal generated is not pertinent to our invention. We prefer, however, to use an electrical float switch connected to stop the gas engine or motor driving the rod. In this way further leakage is prevented until the necessary repairs are made. Due to the usual atmosphere about a wellhead only explosion proof switches should be used.

For a further description of our invention, reference is made to the appended drawings of which:

Figure 1:
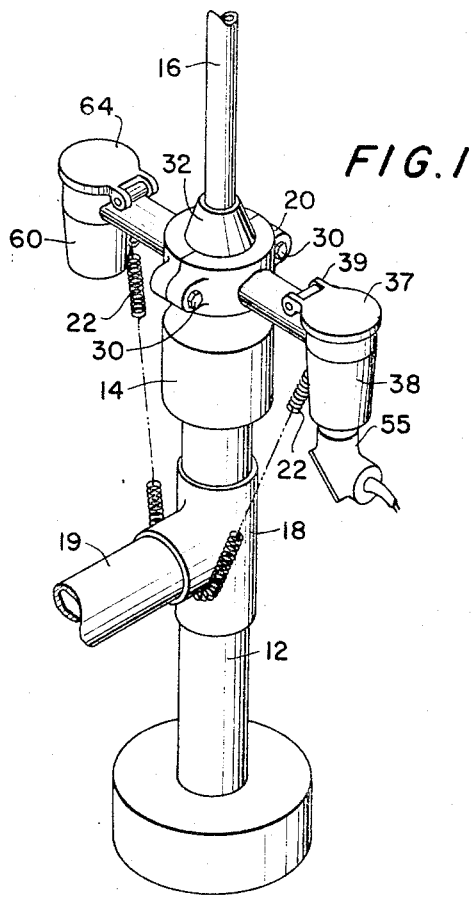
FIGURE 1 is an oblique view of a wellhead constructed according to the present invention.

Referring to FIGURE 1 a typical wellhead 12 is shown. Wellhead 12 is a vertical pipe which extends above the ground and threadedly engages a main stuffing box 14 at its upper end through which box a polished rod 16 passes vertically into wellhead 12. A T 18 located immediately below stuffing box 14 permits oil to flow from wellhead 12 to storage through a horizontal pipe 19. In accordance with our invention an auxiliary stuffing box 20 surrounds rod 16 urged firmly down against stuffing box 14 by a tension spring 22 stretched under pipe 19.

Figure 2:
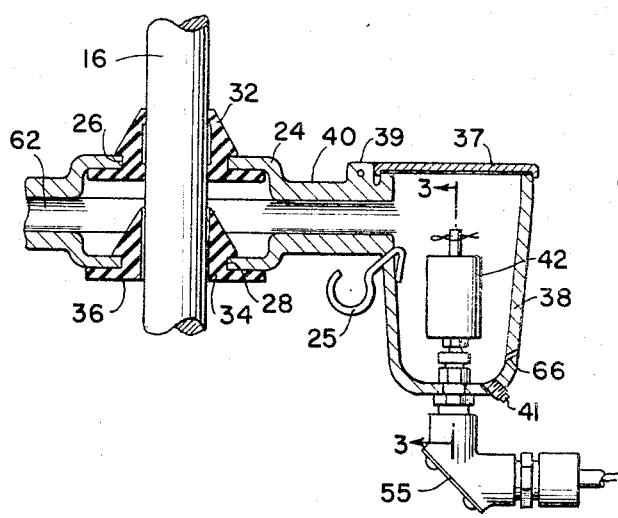
FIGURE 2 is an elevation in section of an auxiliary stuffing box suitable for use in the wellhead construction shown in FIGURE 1.

In FIGURE 2 auxiliary stuffing box 20 is shown in more detail, and includes an enclosed cylinder 24 having vertically alinged holes 26 and 28 at the top and bottom respectively through which rod 16 passes. Cylinder 24 is preferably of two-piece construction, as shown in FIGURE 1, the two pieces being held together about rod 16 by suitable bolts 30.

A frusto-conical shaft seal 32 made of suitable resilient material such as neoprene rubber is inserted in the uppermost hole 26. Seal 32 fits snugly about rod 16 with its narrower portion extending above cylinder 24 and prevents passage of dirt into or liquid out of cylinder 24 along rod 16. The outer portion of seal 32 is slotted to engage the edge of hole 26 and holding the seal in position about the rod at the top of cylinder 24.

A second seal 34 of similar design and material is inserted in the lower hole 28 with its narrower portion extending into cylinder 24. Seal 34 receives rod 16 loosely thereby permitting liquid to pass along rod 16 to or from cylinder 24. The outer portion of seal 34 similarly is slotted to hold it in position about the rod at the bottom of cylinder 25. The base 36 of seal 34 contacts the top of stuffing box 14 over a large area to prevent oil from escaping horizontally between stuffing box 14 and cylinder 24. A positive downward force is exerted on cylinder 24 and seal 34 by tension spring 22 attached at its ends to hooks 25 on opposite sides of cylinder 24 and stretched beneath the leg of T 18 to which pipe 19 is connected.

An enclosed vessel 38 is connected and near is upper end to cylinder 24 through a tube 40 which supports and laterally communicates vessel 38 with cylinder 24 to receive any liquid which accumulates in cylinder 24 above a minimum level. Vessel 38 contains a float switch 42 responsive to an accumulation therein of liquid. For ease in maintenance of vessel 38 its top 37 is attached by a hinge 39 and a drain plug 41 is provided in its base.

Figure 3:
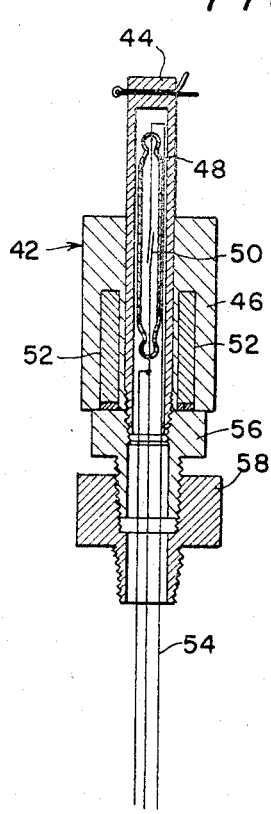
FIGURE 3 is an enlarged vertical section taken at line 3—3 in FIGURE 2.

Float switch 42, as shown in more detail in FIGURE 3 includes a hollow, upright center post 44 and an annular float body 46 received about post 44. Center post 44 contains a hermetically sealed glass chamber 48 which houses two electrical contacts 50. These contacts are closed and opened by permanent magnets 52 embedded in opposite sides of body 46 when the latter moves up and down on center post 44 to place magnets 52 in the proximity of and to withdraw magnets 52 away from contacts 50 in response to changes in the level of liquid in vessel 38. Body 46 can therefor be made of any construction whose apparent density is less than that of crude oil and is most desirably made of non-corrosive rubber or plastic. Port 44 must also be of non-magnetic material such as brass or aluminum. Suitable leads 54 extend through the bottom of center post 44 and via suitable fittings 56 and 58 in which post 44 is mounted out through the bottom of vessel 38 where they are connected as desired.

Leads 54 are preferably passed through a suitable conduit 55 and terminated in an explosion proof junction box which can be clamped to the wellhead or pumping rig. If it is desired to use switch 42 to shut down a gas engine one terminal of the junction box is connected to the engine magneto and the other is connected to the ground. If on the other hand it is desired to stop an electric motor both terminals of the junction box should be connected to a transformer relay in the motor starting panel.

It will be noted any leak of oil from the interior of wellhead 12 past stuffing box 14 will result in the leaked oil passing seal 36 into cylinder 24 by reason of the loose fit of seal 34 about rod 16. Such leaked oil is at least partly entrapped and accumulated in cylinder 24, as seal 32 wipes rod 16 clean on the upstroke spilling the leaked oil over the outside of seal 34. When the minimum of leaked oil required to fill the bottom of cylinder 24 up to the level of tube 40 is accumulated in cylinder 24, further oil leakage spills along tube 40 to flow into the vessel 38 in which the oil is again entrapped and accumulated until a sufficient quantity is accumulated to float and raise float body 46 to a point actuating contacts 50, whereupon an alarm is sounded, the pump motor driving rod 16 is stopped or other suitable action initiated by actuation of contacts 50 takes place.

We prefer to incorporate an auxiliary lubricator into the wellhead leak detector of our invention. This is easily done as shown in FIGURE 1 by connecting a second vessel 60 similar in size and shape to vessel 38 to cylinder 24 through a tube 62 similar to tube 40. In this case vessel 60 is filled with oil and cylinder 24 is partially filled with felt pads moistened with oil from vessel 60 by a fiber wick. The felt pads contact rod 16 and apply a light coat of oil to it if the rod loses its primary source of lubrication, namely, when oil stops flowing from the well. For ease of maintenance vessel 60 has a hinged cover 64 and a drain plug which is not shown.

When the auxiliary lubrication described above is incorporated in the auxiliary stuffing box 20 it is likely that some oil from this source will be collected in vessel 38. To prevent this oil from affecting float switch 42 a small weep hole 66 is incorporated in cup 38. This hole is large enough to drain a normal amount of oil likely to occur in vessel 38 from the auxiliary lubricator, but not large enough to drain an excess of oil which would flow into vessel 38 in the event of a packing failure.

Although we have described our invention with reference to a particular construction which has proved successful many variations should be obvious to the reader. For example, float switch 42 could be replaced by a mechanical float switch or the auxiliary lubricator could be supplied by other commercially available devices.

We have found that wellheads constructed according to our invention operate safely over extended periods of time without requiring the attention of operators or other technical personnel. We have found, however, that some maintenance goes a long way toward prolonging the life and usefulness of the equipment. Especially helpful is occasional cleaning of the float switch to remove paraffin deposits which if allowed to accumulate for extended periods of time may prevent movement of float body 46 on the center post 44.

We claim:

1. In an oil pumping apparatus which includes a wellhead, a main stuffing box attached to the top of the wellhead, and a polished rod movable therethrough; an auxiliary stuffing box on said rod above said main stuffing box including a central enclosure having vertically aligned upper and lower apertures, upper and lower shaft seals retained in said upper and lower apertures, said upper seal snugly surrounding said rod to prevent passage of oil therealong and said lower seal loosely surrounding the rod to permit passage of oil therebetween, a conduit connected to said enclosure for draining liquid therefrom, an oil collection vessel having means responsive to an accumulation of liquid therein connected to said conduit to receive liquid drained therethrough, and means holding said auxiliary stuffing box against said main stuffing box with said lower seal in liquid tight contact thereagainst.

2. An apparatus according to claim 1 wherein said auxiliary stuffing box is vertically split and the separate pieces are bolted together about the rod.

3. An apparatus according to claim 1 wherein said central enclosure also includes lubrication means and said oil collection vessel includes drainage means sufficient to remove from said vessel oil occurring therein from said lubrication means.

References Cited by the Examiner
UNITED STATES PATENTS

| | | | |
|---|---|---|---|
| 2,480,055 | 8/1949 | Seaton | 277—126 X |
| 2,513,714 | 7/1950 | Cordes | 166—81 |
| 2,674,474 | 4/1954 | Lister | 277—18 X |
| 3,180,134 | 4/1965 | Wadlington | 277—3 X |
| 3,209,830 | 10/1965 | Orr et al. | 277—2 X |

SAMUEL ROTHBERG, *Primary Examiner.*